United States Patent
Zocchi

(10) Patent No.: US 6,692,862 B1
(45) Date of Patent: Feb. 17, 2004

(54) REDOX FLOW BATTERY AND METHOD OF OPERATING IT

(75) Inventor: Andrea Zocchi, Firenze (IT)

(73) Assignee: Squirrel Holdings Ltd. (KY)

( * ) Notice: Subject to any disclaimer, the term of this patent is extended or adjusted under 35 U.S.C. 154(b) by 0 days.

(21) Appl. No.: 09/980,005

(22) PCT Filed: Mar. 31, 2000

(86) PCT No.: PCT/IT00/00117

§ 371 (c)(1),
(2), (4) Date: Nov. 30, 2001

(87) PCT Pub. No.: WO01/76000

PCT Pub. Date: Oct. 11, 2001

(51) Int. Cl.⁷ .......................... H01M 10/44; H01M 4/36
(52) U.S. Cl. .......................... 429/50; 429/51; 429/101; 429/105
(58) Field of Search ................. 429/50, 51, 52, 429/105, 101

(56) References Cited

U.S. PATENT DOCUMENTS 3,996,064 A * 12/1976 Thaller ..................... 320/128
4,797,566 A * 1/1989 Nozaki et al. ............. 307/43
4,930,492 A 6/1990 Rich ........................ 126/420

FOREIGN PATENT DOCUMENTS

| JP | 61269866 | 11/1986 |
|----|----------|---------|
| JP | 63164172 | 7/1988 |
| JP | 01146267 | 6/1989 |
| JP | 01213964 | 8/1989 |
| JP | 01213967 | 8/1989 |
| WO | WO 99/39397 | 8/1999 |

* cited by examiner

*Primary Examiner*—Stephen Kalafut
*Assistant Examiner*—R Alejandro
(74) *Attorney, Agent, or Firm*—Connolly Bove Lodge & Hutz LLP; Larry J. Hume

(57) ABSTRACT

By realizing or installing check valve liquid vein interrupters in each compartment of the battery the phenomenon of slow discharge of the retained volumes of electrolytes during long periods of inactivity of a redox flow battery, with the electrolyte pumps stopped altogether, can be practically eliminated with the effect that the battery is perfectly ready to deliver electric power immediately upon request even after prolonged periods of inactivity. Moreover, the presence of liquid vein interrupters on each compartment in either an outlet or an inlet port substantially preventing by-pass current during a not pumping phase, permits to increase the by pumping the electrolytes through the compartments of a battery stack intermittently, in other words in a pulsed manner, with a certain duty-cycle. Relatively brief pumping phases at relatively high flow rate alternated to phases of not pumping provide for a volumetrically adequate refreshing of the electrolytes present in the battery compartments and contrast the formation of gradients in the bodies of electrolyte.

10 Claims, 4 Drawing Sheets

REDOX FLOW BATTERY AND METHOD OF OPERATING IT

BACKGROUND OF THE INVENTION

1. Field of the Invention

This invention relates generally to electrochemical reactors for conducting reduction and oxidation reactions in respective positive and negative liquid electrolytes, without gas evolution at the electrodes. More specifically, the invention relates to the operation of a membrane-separated, bipolar multicell electrochemical reactor implementing a redox flow battery system, although it may be useful also for different systems.

2. Description of Related Art

Redox flow battery systems are increasingly attracting interest as efficient energy storage systems. Among redox couple candidates, the all vanadium redox system is one of the most preferred.

Structurally, the electrochemical reactors that have been proposed for redox flow battery systems, have been derived from the electrochemical reactor structures developed for general electrolysis processes, the only adaptation having concerned the materials employed as electrodes.

Generally, the electrochemical reactors used as redox batteries are conventionally composed of a stack of bipolar plate electrode elements separated by ion exchange membranes, defining a positive electrolyte flow chamber on one side of each membrane and a negative electrolyte flow chamber on the opposite side thereof. The stack of bipolar elements is assembled together in a filter-pass arrangement between two end electrode elements.

Commonly, the elements have a frame provided with coordinated through holes forming inlet and outlet manifolds for the two electrolytes that are circulated in a parallel mode through the positive electrolyte flow chambers and the negative electrolyte flow chambers, respectively.

The elements are conventionally mounted and operated in a vertical position.

The parallel flow of the two electrolytes through the respective flow chambers poses serious problems in terms of minimization of so-called stray or by-pass electric currents in uninterrupted liquid veins of electrolyte, due to the fact that the electrolyte present in the manifolds offer innumerable paths for these by-pass or stray currents, driven by mutual voltage differences existing among the various bipolar elements functioning in electrical series between the two end electrodes on which the full battery voltage difference insists. By-pass or stray currents decrement the energy efficiency of the conversion system, but more seriously they cause severe corrosion phenomena on conductive parts (e.g.: carbon) because of abnormally high half-cell voltages at the conductor surface.

On the other hand, the redox system require nonnegligible electrolyte flow rates through the flow chambers of the reactor in order to maintain optimal half-cell reactions conditions at the electrodes and this requirement may imply the necessity of operating the bipolar electrochemical reactor at relatively high positive pressures.

A different architecture, object of the prior patent application PCT/IT99/00195 of the same applicant, contemplates alternately stacking a bipolar electrode holding subassembly and a membrane holding subassembly, laying them horizontally.

The alternate stack of elements is piled over a bottom end element and the stack is terminated by placing over the last membrane holding element a top end electrode element. The two end electrode elements are then compressed over the stack by tightening a plurality of tie rods, conventionally arranged around the perimeter of the stacked elements, according to a common practice in tightening a filter-press stack in a hydraulically sealed manner, by virtue of the gaskets operatively installed between the coupling faces of the frames of the various elements. The battery may be operated with the piled elements laying horizontally.

In the above noted architecture, each bipolar plate electrode holding element and each ion exchange membrane separator holding element includes a substantially similar rectangular frame piece, made of an electrically nonconductive and chemically resistant material, typically of molded plastic material, having on its upper (assembly) face grooves for receiving O-ring type gasket means, and having through holes and recesses in coordinated locations disposed along two opposite sides of the rectangular frame forming, upon completion of the assembling, ducts for the separate circulation of the negative electrolyte and of the positive electrolyte through all the negative electrolyte flow chambers and all positive electrolyte flow chambers, respectively, in cascade.

The negative electrolyte enters along a first side of a negative electrolyte flow chamber, flows through the chamber toward the opposite or second side thereof, exits the chamber, flows through the coordinated holes through the frame holding the electrode and through the frame holding the next membrane separator, reaching the level of the next negative electrolyte flow chamber and enters it from the same second side through which it exited from the previous negative electrolyte flow chamber and exits this next negative electrolyte flow chamber from the same first side it entered the previous negative electrolyte flow chamber, to flow through coordinated holes through the next pair of frames to the level of the next negative electrolyte flow chamber and so forth. The same flow path is arranged also for the positive electrolyte, either in a "countercurrent" or in an "equicurrent" mode through the battery.

In practice, the bipolar electrochemical reactor does not have inlet and outlet manifolds for the two electrolytes, on the contrary, the electrolytes flow through the respective flow chambers in a zigzag path, that is essentially in hydraulic series or cascade mode instead than in hydraulic parallel mode.

In this way, by-pass current may only be "driven" by a voltage difference of about one-cell voltage and it does not cause any corrosion on conductive parts.

Pitting corrosion is not the only consequent of by-pass currents.

By-pass currents lower the overall efficiency of the charging and discharging processes because by-pass currents represent parasitic discharge mechanisms of the flow redox battery.

A typical way of using flow redox battery systems is to accumulate energy by transforming electrical energy into chemical energy during periods of excess electrical power generating capabilities (for example solar energy conversion during daylight hours or excess electrical power capabilities during night time hours in power generation plants) and to deliver accumulated energy in the form of electrical power when required by a load circuit.

Often, in the normal daily cycling of a flow redox battery system there may be prolonged periods of inactivity that is periods when the battery is not charging nor supplying electrical power to an external load circuit. During these idle periods, the pumps that circulate the positive electrolyte and the negative electrolyte through the cell are switched off to save energy and the electrolyte in the battery remain still.

In these conditions, the volumes of electrolytes, contained in the respective compartments of the cells composing the battery stack, supports the by-pass currents that typically are practically entirely confined within the electrolyte battery stack and therefore tends to slowly decrement their state of charging.

As a consequence, if electrical energy is required by the utilizer circuits, the system may take several minutes of "start-up" before becoming ready to provide the appropriate output voltage, a condition that is attained upon a complete refreshing of the electrolytes in the compartments of the battery stack upon resuming their forced circulation by switching on the respective pumps.

This phenomenon may impose the presence of auxiliary battery systems for providing the electrical power necessary to operate the electrolyte pumps at least during the "start-up" period when the output voltage of the battery may have dropped to an insufficient level because of the intervening discharge of the electrolytes volumes retained in the respective compartments during a protracted period of idleness.

Of course, in applications where this is intolerable, a possible solution would be to maintain a trickle charge current through the battery deriving such a maintenance power from an auxiliary source or maintain the electrolyte pumps in function to prevent a deep discharging of the electrolytes in the battery compartments. Both solutions are penalizing in terms of energy requirement, especially in those applications that contemplate prolonged periods of inactivity of the system.

Another critical aspect that has been observed is the ability of exploiting the fullest nominal cell area of the battery.

This criticality manifests itself at relatively high regimes of operation, that is when the level of current flowing through the battery, either in a discharge direction or in a charging direction, approaches the rated maximum value that, apart from other design parameters, is directly tied to the cell area (or active electrode area).

It has been found that the major factor effecting the ability of a battery to support relatively high currents while maintaining an acceptable reversibility is the formation of velocity gradients within the electrolyte flowing in the relatively narrow gap between the bipolar wall and the ion exchange separator in the cell compartments.

The problem becomes even more critical when the active electrodes are in the form of a felt or of alike open structures crossed by the streaming electrolyte forced by the pumps.

Formation of velocity gradients in the body of electrolyte within an electrode compartment implies that numerous zones of the nominal cell area will tend to contain a relatively depleted (that is less charged) electrolyte than other zones where the pumped electrolyte tends to flow preferentially.

In extreme conditions, this phenomenon may in practice reduce the effective cell area (or active electrode area) to a fraction of the nominal size.

At high electric current regimes, the phenomenon manifests itself in a severe drop of the output voltage, during a discharge phase and in an abnormal rise of the voltage across the battery, during a charge phase.

To cure this problem and optimize the pumping "cost", it is a trivial expedient to increase the pumping rate of the electrolyte in function of the current through the battery. However, even this approach implies a remarkable penalty in terms of overall efficiency due to an augmented power absorption by the pumps.

Conventional considerations on hydraulic systems and the objective of limiting the power expenditure for pumping the electrolytes have led designers to minimize the flow rates of the electrolyte to the lowest value compatible with the requisites of providing for an adequate refresh of the electrolyte throughout the area of the cell compartments at the particular current of operation. The flow of electrolytes in known electrolysers and in particular in redox flow batteries is laminar in order to take place with minimum pressure drops.

OBJECT AND SUMMARY OF THE INVENTION

Vis-à-vis this state of the art, it has now been found that by realizing or installing check valve liquid vein interrupters in each compartment of the battery the above discussed phenomenon of slow discharge of the retained volumes of electrolytes during long periods of inactivity of the battery, with the electrolyte pumps stopped altogether can be practically eliminated with the effect that the battery is perfectly ready to deliver electric power immediately upon request even after prolonged periods of inactivity.

Moreover, by virtue of liquid vein interrupters present on each compartment in either an outlet or an inlet port substantially preventing by-pass current during a not pumping phase, a definitely augmented overall efficiency may be achieved by pumping the electrolytes through the compartments of a battery stack intermittently, in other words in a pulsed manner, with a certain duty-cycle.

According to this embodiment, during normal functioning, relatively brief pumping phases at relatively high flow rate alternated to phases of not pumping. In this way, providing for a volumetrically adequate refreshing of the electrolytes present in the battery compartments, the formation of gradients in the bodies of electrolyte, each representing the volume of electrolyte currently contained in a compartment of the battery, is contrasted.

It has been observed that, a proportionately augmented flow rate of pumping during the pumping phase of each cycle, such to cause a turbulent flow that may last practically for the entire pumping phase of each cycle or develop for just a fraction of the duration of the brief pumping phase, appears to be instrumental in "destroying" any incipient tendency of the electrolytes streaming through the compartments of the battery of assuming preferred flow patterns.

In case of the existence of "free flow" gaps in the compartments, substantially between the face of the active electrode and the ion exchange membrane cell separator, the slight increase of the pressure drop associated to the switching from a laminar to a turbulent flow is abundantly counterbalanced by the markedly improved conditions of operation and a remarkable improvement of the reversibility characteristic of the battery and an overall net increase of conversion efficiency are observed.

Most surprisingly it has been observed that in case of a cell structure with "no free flow" gaps in the compartments, that is when a felt electrode or otherwise porous electrode mass occupies practically the entire space between the bipolar (or end) wall and the ion exchange membrane cell separator, the pressure drop along the battery may even decrease as compared to the case of a conventional continuous pumping under uninterrupted and purely laminar flow conditions.

An explanation of this may be attributed to the peculiar conditions under which the flow of the electrolyte occurs through a porous mass of solid electrode fiber or particulated material, as noted in the volume "Perry's Chemical Engineer Handbook" chapter 5.53: "Flow through fixed beds of granular solids".

Irrespective of the physical explanation of such a behavior, the beneficial effects of circulating the electrolytes through the cell compartments of the battery in a pulsed manner and preferably with periods of turbulent flow within the compartments, are sensible.

According to a preferred embodiment of the invention, the realization of check valve means in the inlet and/or in the outlet port or ports of each compartment of the cell composing the battery stack, is simple and inexpensive. In a simplest form, these check valves may be realized by confining a ball of noncorrodible material such as Teflon, polyethylene and any other suitable plastic material, provided its density is sufficiently greater than the density of the electrolyte, within a "housing" defined upon assembling together the elements of the battery stack which will permit the lifting off of the ball from a valve seat on which it rests by gravity, upon activating the circulation pumps. Of course, electromagnetically or even magnetically operated check valves could also be employed, although sensibly complicating the design.

BRIEF DESCRIPTION OF THE DRAWINGS

The different aspects and advantages of the invention will become even more evident through the following description of several embodiments and by referring to the attached drawings, wherein.

DESCRIPTION OF EMBODIMENTS OF THE INVENTION

Figure 1:
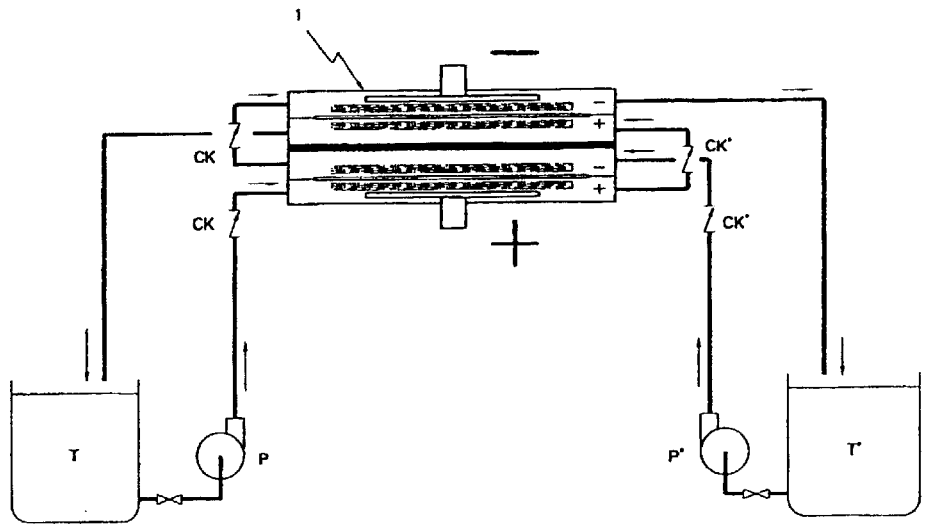
FIGS. 1 and 2 show alternative hydraulic schemes of the two electrolytes including the check valve means of the invention.
Figure 2:
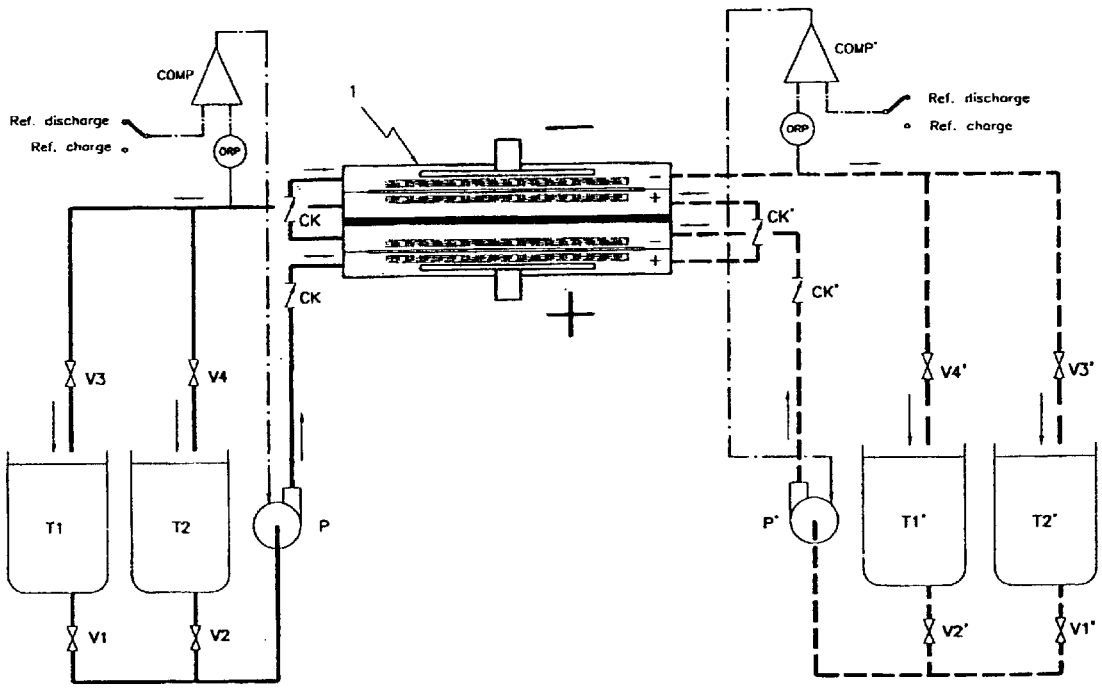

Generally, redox flow battery systems may adopt a "recycling" scheme of both electrolytes, by employing a single tank in each of the two circuits, as in the example depicted in FIG. 1, or a so-called "one through" scheme, requiring a pair of tanks in each of the two electrolyte circuits, according to the scheme of FIG. 2.

According to the scheme of FIG. 1, each electrolyte is flown to and from the same reservoir through the respective electrode compartments of the series of cells composing the battery stack in the same direction during the discharge and the charge processes.

According to the scheme of FIG. 2, each electrolyte is flown through the respective electrode compartments of the series of cells that compose the battery stack, drawing it from the tank containing the charged electrolyte, T1 and T1', and transferring it to the tank recovering the spent electrolyte, T2 and T2', during the discharge process, and vice versa during the charge process. In case of a "one through" scheme, it becomes essential to vary the flow rate of the two electrolytes in function, for example, of the electric current through the battery in order to make an efficient use of the energy storing volumes of the two electrolytes.

A more sophisticated control may avail itself of probes, ORP, of the actual redox potential, referred to a standard reference electrode, of the two electrolytes preferably placed in the outlet streams from the last cell compartment of the battery stack and being conveyed to either the respective spent electrolyte tanks, T2 and T2', or to the respective charged electrolyte tanks, T1 and T1', depending on whether the battery system is delivering power or is being recharged.

The flow rate of each electrolyte may be independently regulated in function of the sensed redox potential in order to maintain a pre-established minimum redox potential in the electrolyte being discharged leaving the battery stack during a current delivering phase of operation or a pre-established maximum redox potential in the electrolyte being charged leaving the battery stack during a charging phase of operation. Any suitable logic circuitry may be employed to switch automatically the threshold potential to the value set for the discharge process or to the value set for the charge process, in function of the direction of the electric current through the battery stack. A possible arrangement is schematically illustrated in FIG. 2.

Even in case of a hydraulic scheme as that of FIG. 2, the transfer of each electrolyte alternately to one and the other tank can be driven by a single pump, P and P', assisted by four electro-magnetically operated valves: V1, V2, V3, V4 and V1', V2', V3', V4', respectively.

P pumps the positive electrolyte from the tank T1 to the tank T2 when charging the battery by maintaining open V1 and V4 and closed V3 and V2. By contrast, when the battery discharges, the same positive electrolyte is transferred back from T2 to T1 by maintaining open V2 and V3 and closed V1 and V4.

Of course, the same type of flow control is implemented also for the negative electrolyte.

As may be appreciated, the flow of each electrolyte through all the relative electrode compartments of the cell stack occurs in the same direction both during the charging process as well as during the discharge process.

In the figures, only two cells are depicted for representing a battery stack that may be composed of any number of cells in electrical series, typically in the order of several tens or even of hundreds of cells.

According to an essential aspect of the invention, each electrode compartment has check valve means, CK or CK', at either its inlet port (or ports in case of large cells) and/or at its outlet port (or ports).

These check valves CK and CK' have been schematically depicted in FIG. 1 and 2 as being external to the cell stack 1, just for rendering more evident the function they perform.

In practice, upon the stopping of the circulation pump P, the check valves isolate the volumes of positive electrolyte retained in the positive electrode compartments from each other as well as from the volumes of electrolyte contained in the respective single tank of FIG. 1, or of the two tanks T1 and T2 of FIG. 2, by practically interrupting the liquid veins of electrically conductive electrolyte.

Exactly the same occurs for the volumes of negative electrolyte retained in the negative electrode compartments.

Figure 3:
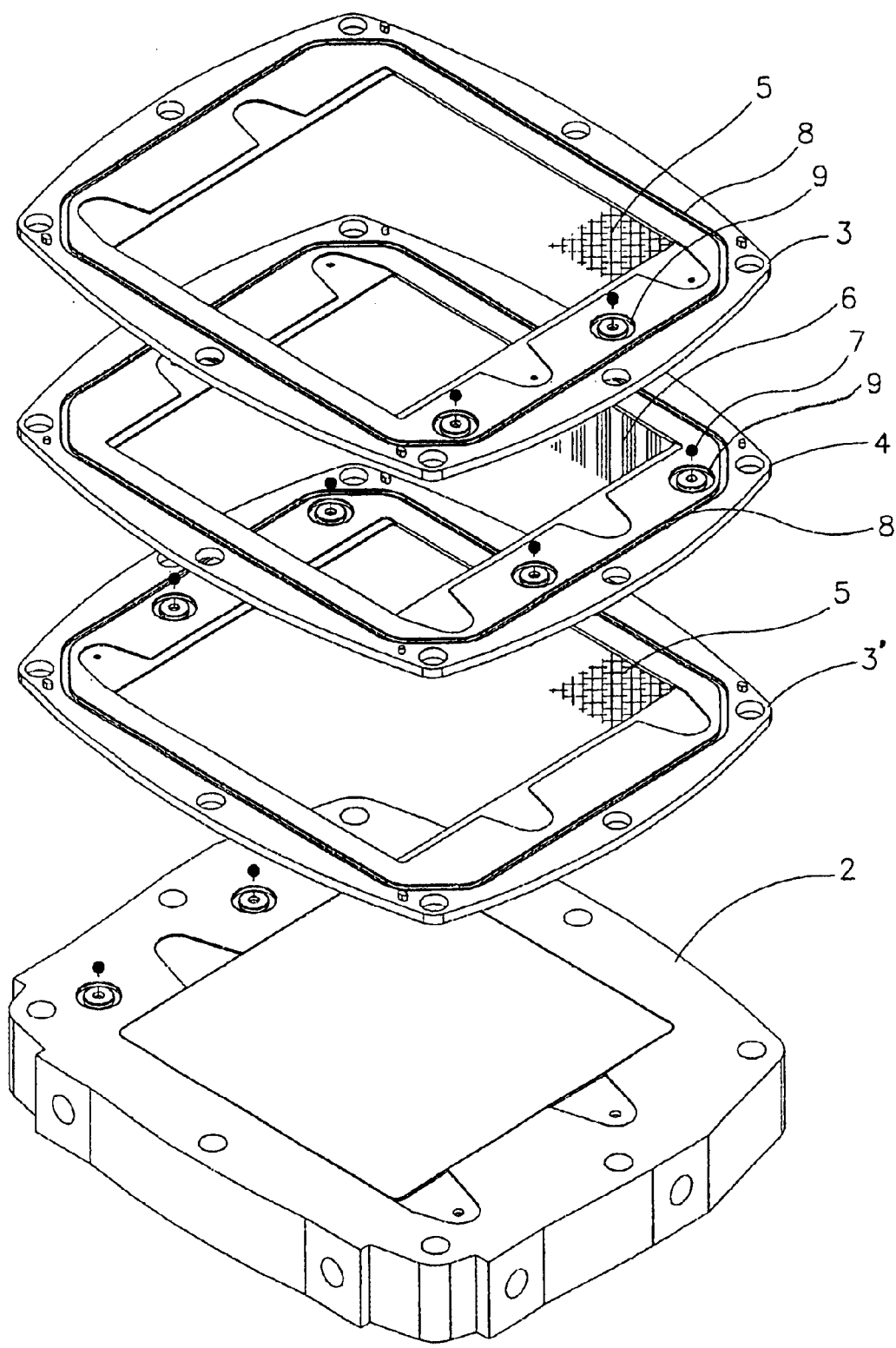
FIG. 3 is a partial exploded view of stackable element frames of a known battery architecture equipped with check valve means according to the present invention.

In order to illustrate how effective check valve means CK and CK' may be realized with simple gravity operated ball inserts installed upon assembling the suitably modified stackable component elements of the bipolar cell stack, few of the stackable elements are shown, in an exploded view, in FIG. 3.

The example shown reproduces substantially the same stack architecture described in prior patent application PCT/IT99/00195.

For conformity with the schemes of FIGS. 1 and 2, the element 2 of FIG. 3 represents the end element of the cell stack housing a positive electrode (not shown) in a first positive electrolyte flow compartment.

The elements 3 and 3' are membrane elements and the element 4 is a bipolar electrode element.

All elements have a similarly shaped frame portion, usually made of moldable plastic, on which the grooves 8, 9 into which fit sealing O-ring gaskets are defined. In the frame portion are present through-passages (holes) and slots coordinated among each other for defining, upon assembling together all the various elements, distinct internal ductings and flow passages for the two electrolytes, according to the architecture described in said prior patent application or in alternative according to any other commonly known architecture of electrochemical bipolar cell stack.

In the particular example shown, the stackable membrane elements 3 and 3' and bipolar electrode elements 4, respectively, fit within the window defined by the frame portion of an ion exchange membrane 5 or a bipolar electrode 6, respectively.

As schematically depicted in the exploded partial view of FIG. 3, in each passage hole of the electrolyte, arranged in the frame portion of the elements, a small ball 7 of a suitable material such as for example glass, ceramic, nylon® or teflon®, or any other corrosion resistant material of sufficiently higher density than the electrolytes, is placed within a suitably flared mouth of the hole through which the electrolyte passes so that it may fall and rest by gravity at the bottom of the flared mouth, effectively interrupting the liquid vein of the electrolyte in the passage through the thickness of the frame portion of the element in its flowing toward the next electrode compartment of the same polarity of the cell stack.

Figure 4:
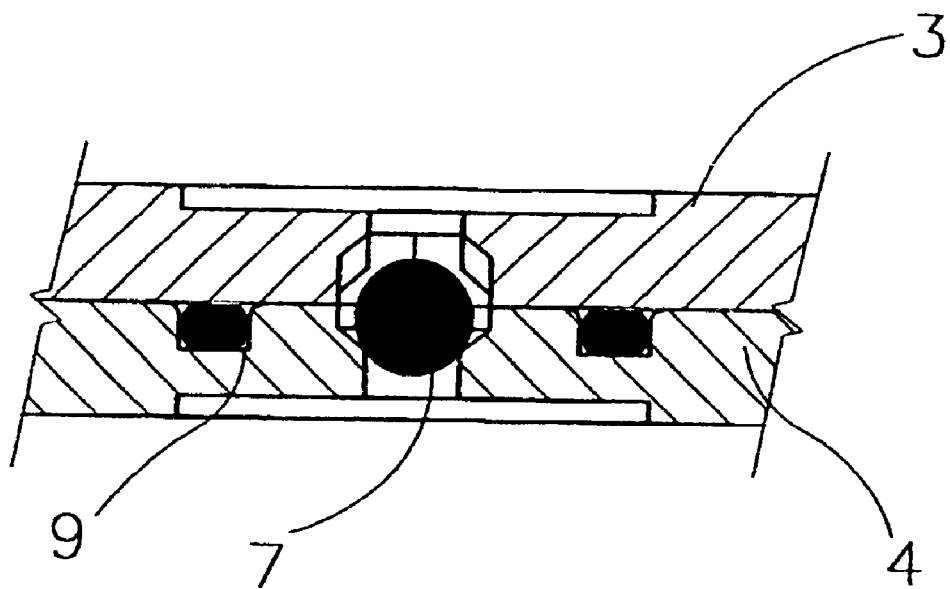
FIG. 4 is a detail cross section of an outlet port of a cell compartment showing the realization of a "gravity ball" valve.

The arrangement is better depicted in the enlarged detailed cross section view of FIG. 4.

As may be readily seen, upon completing the filter press assembly of the stack, the ball 7 remains confined within a housing defined by the juxtaposed flared mouths of the electrolyte flow holes through the frame portions of two adjacent elements of the stack.

When the circulation pump stops, for example during idle periods of the battery, the ball 7 drops by gravity practically interrupting the liquid vein of the electrolyte. Immediately as the circulation pump is turned on again either for charging or for discharging the battery, the motion impressed on the electrolyte dislodges the ball 7 from its seat and lifts it so that the electrolyte resumes its flowing through the various compartments of the battery stack. Of course the flared mouth of the cooperating hole in the frame portion of the juxtaposed element has slots or is shaped in a way as to ensure a free flow of the electrolyte upon the lifting of the ball 7.

This check valve action is exerted not only during prolonged idle periods but eventually also during each no-flow phase, in case of a pulsed pumping of the electrolyte according to another important aspect of this invention.

In either situations, the check valve action performed by the ball inserts 7 effectively isolate the volumes of electrolyte retained into the cell compartments from each other, effectively preventing discharge processes through stray currents.

Of course, in case of cells of considerable size, in order to improve electrolyte distribution within the flow compartments, each electrolyte path from one compartment to the next of the same polarity in case of a sequential flow stack as the one described in said prior patent application PCT/IT99/00195 of the same applicant, or from an inlet manifold to an outlet manifold through as many paths as there are electrode compartments of same polarity, may indeed include several inlet and outlet ports in parallel distributed along opposing sides of each compartment. In this case, each of the inlet or outlet ports must be provided with check valve means. In practice this means that the check valve device realized by the use of ball inserts 7 must be duplicated for as many ports are realized in the cell compartments.

The check valve devices CK and CK' may be present either in the inlet ports or in the outlet ports, however they may even be duplicated so that their liquid vein interrupting action be exerted both at the inlet ports and at the outlet ports of each compartment.

A horizontal disposition of the cells elements of the matrix stack according to the architecture of said prior patent application, makes particularly easy the realization of functional check valve devices as described above. Nevertheless, though with a certain adaptation of the design, the same effective gravity operated ball check valve devices may be implemented even in the frame portions of vertically disposed cell stack elements (as customary in these types of filter press bipolar electrolyzers).

Indeed any functionally effective way of implementing check valve devices in the inlet and/or outlet ports of each cell compartment of a battery stack assembly will provide for the desired effect of interrupting the liquid veins of electrolyte along by-pass or stray current paths during idling phases or periods of the electrolyte circulation pump or pumps, according to the present invention.

EXAMPLE

An all vanadium redox flow battery system according to a scheme as the one depicted in FIG. 2 and employing a battery stack composed of twelve cells in electrical series, each having carbon felt electrodes of 18×18 cm separated with a cation exchange Nafion® membrane, manufactured by Du Pont de Nemours, was considered fully charged when attaining a concentration of $V^{+5}$ in the positively charged sulfuric acid electrolyte and a concentration of $V^{+2}$ in the negatively charged sulfuric acid electrolyte above 90% molar of the total amount of vanadium dissolved in the sulfuric acid electrolyte.

The battery stack was first assembled without implementing any check valve in the inlet and outlet ports of the electrode compartments.

After charging it, the system has been left idle by stopping the pumps and opening the electric circuit.

The battery voltage at the moment of stopping the pumps and opening the circuit was of 17.1 V, but notwithstanding the absence of any electrical load capable of absorbing current from the battery terminals, the voltage at the battery terminals declined more or less steadily during the first two hours of idling to about 14.7 V. Thereafter the voltage continued t& drop to an increased rate and was down to about 8 V after a total period of idling of three hours.

Such a "self-discharge" test was repeated under the same conditions of initial charge and temperature, with the same battery stack this time assembled with glass balls inserts in the outlet ports of each compartment to implement the gravity operated check valve means according to this invention.

After the same time of idling, the voltage at the terminal of the battery had dropped from the starting 17.1 V to 17.0 V.

Figure 5:
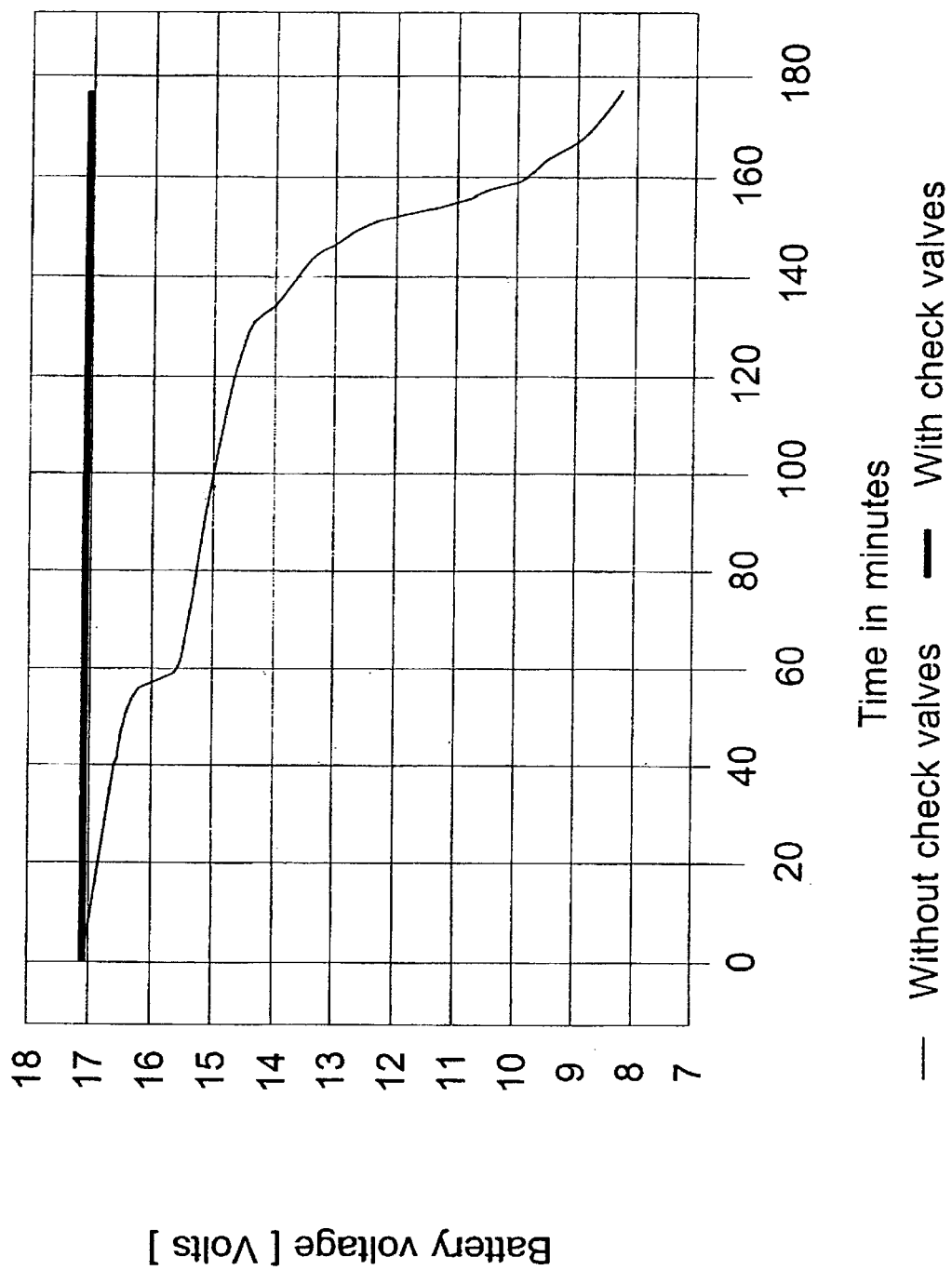
FIG. 5 shows self discharge characteristics comparing the behavior of a cell provided with check valves according to the invention and without.

The self-discharge characteristics for the two comparative tests are shown in the diagram of FIG. 5.

The test has confirmed the effectiveness of the simple, gravity operated, check valve means of the invention in contrasting and substantially preventing self-discharge of the volumes of electrolytes retained in the respective compartments of the cell stack during idle periods with complete interruption of the pumping.

The battery is immediately ready to deliver power to an electric load even after prolonged stoppages of the pumps and therefore permit a considerable saving of energy that would necessarily be lost either for maintaining a trickle flow of the electrolytes or for quickly refreshing the electrolytes in the battery compartments whenever power is requested after a prolonged stop.

According to the secondary and optional aspect of the invention, a pulsed pumping the electrolytes, may be implemented. This may be done in many different ways.

The use of specially designed reciprocating pumps is one way of implementing the desired pulsed pumping. An alternative way may be to use pressure accumulating vessels and electrically controlled on-off electrolyte feed valves.

Irrespectively of the way the pulsed pumping is realized, during normal operation of the battery, either during a charging process or a discharging process, the period of the pulsed pumping may be fixed or variable and in the vicinity of one to several minutes, preferably comprised between 2 and 10 or even more minutes. The duty cycle may vary in function of the current flowing through the battery and may vary from 0 (idling of system) to about 80–90% of the period of the pulsed pumping.

Alternatively, the duty cycle may be regulated in function of redox potential probes, according to similar control schemes used for controlling the flow rate during "normal" operation of the battery, that is for powering an electric load or for recharging, sensing the output voltage in a closed external circuit condition.

Preferably, during the pumping phase of each period, the flow rate should rise to above the transition rate from a laminar to a turbulent flow within the cell compartments crossed by the streaming electrolyte. The reaching of turbulent flow conditions effectively disrupt any tendency of the electrolyte to assume preferential flow patterns in streaming through the cell compartments, that is in the relative narrow and elongated flow section of the cell compartments.

What is claimed is:

1. A method of operating a redox flow battery comprising a plurality of cells in electrical series defined by a stacked and repetitive arrangement of a conductive intercell separator having a generally bipolar function, a positive electrode, an ion exchange membrane, a negative electrode and another conductive intercell separator, each electrode being confined in a flow compartment, comprising flowing a positive half-cell electrolyte containing reducible and oxidizable ions of a first redox couple through the compartments containing said positive electrodes from a first tank through said compartments and back to said tank or to a second tank and viceversa depending on the direction of the electric current through the battery, and a negative half-cell electrolyte containing reducible and oxidizable ions of a second redox couple through the compartments containing said negative electrodes from a third tank through said compartments and back to said third tank or to a fourth tank and viceversa depending on the direction of the electric current through the battery, characterized in that said electrolytes are flown through the respective electrode compartments in a pulsed manner with a certain duty cycle, whereby during the pumping phase of each cycle the electrolytes are pumped at a flow rate sufficiently high to determine a turbulent flow within said electrode compartments and during the no pumping phase of each cycle and during idle periods the volumes of electrolytes contained in the electrode compartments are isolated from each other by check valve means.

2. The method of claim 1, wherein the period of the pulsed pumping is between 2 and 10 minutes and the duty cycle varies from 0 during idling to 90%.

3. The method of claim 1, wherein said duty cycle varies in function of the electric current through the battery.

4. The method of claim 1, characterized in that said duty cycle is regulated independently for each electrolyte in function of the redox potential of the electrolyte leaving the battery.

5. The method of claim 1, characterized in that electric current by-pass paths among electrodes through liquid veins of electrolyte are interrupted by said check valves during no pumping phases and idle periods.

6. The method of claim 1, wherein the redox flow battery employs a V(III)/V(II) redox couple in the negative half-cell electrolyte and a V(V)/V(IV) redox couple in the positive half-cell electrolyte.

7. The method of claim 2, wherein the redox flow battery employs a V(III)/V(II) redox couple in the negative half-cell electrolyte and a V(V)/V(IV) redox couple in the positive half-cell electrolyte.

8. The method of claim 3, wherein the redox flow battery employs a V(III)/V(II) redox couple in the negative half-cell electrolyte and a V(V)/V(IV) redox couple in the positive half-cell electrolyte.

9. The method of claim 4, wherein the redox flow battery employs a V(III)/V(II) redox couple in the negative half-cell electrolyte and a V(V)/V(IV) redox couple in the positive half-cell electrolyte.

10. The method of claim 5, wherein the redox flow battery employs a V(III)/V(II) redox couple in the negative half-cell electrolyte and a V(V)/V(IV) redox couple in the positive half-cell electrolyte.

* * * * *

UNITED STATES PATENT AND TRADEMARK OFFICE
CERTIFICATE OF CORRECTION

PATENT NO. : 6,692,862 B1
DATED : February 17, 2004
INVENTOR(S) : Andrea Zocchi et al.

It is certified that error appears in the above-identified patent and that said Letters Patent is hereby corrected as shown below:

Title Page,
Item [75], Inventors, should read as follows:
-- [75] Inventors: Andrea Zocchi
                       Barry Michael Broman --

Signed and Sealed this

First Day of June, 2004

JON W. DUDAS
*Acting Director of the United States Patent and Trademark Office*